(12) United States Patent
Kehlenbeck et al.

(10) Patent No.: US 7,454,398 B2
(45) Date of Patent: Nov. 18, 2008

(54) SUPPORT FOR OBJECT SEARCH

(75) Inventors: Alexander P. Kehlenbeck, Brooklyn, NY (US); Andrew W. Hogue, Ho Ho Kus, NJ (US)

(73) Assignee: Google Inc., Mountain View, CA (US)

( * ) Notice: Subject to any disclaimer, the term of this patent is extended or adjusted under 35 U.S.C. 154(b) by 43 days.

(21) Appl. No.: 11/357,748

(22) Filed: Feb. 17, 2006

(65) Prior Publication Data

US 2007/0198451 A1    Aug. 23, 2007

(51) Int. Cl.
*G06N 5/00* (2006.01)
(52) U.S. Cl. .......................................... 706/50; 725/116
(58) Field of Classification Search ................... 706/50; 707/1, 10; 709/203, 225
See application file for complete search history.

(56) References Cited

U.S. PATENT DOCUMENTS

| | | | | |
|---|---|---|---|---|
| 5,475,819 | A * | 12/1995 | Miller et al. | 709/203 |
| 5,560,005 | A * | 9/1996 | Hoover et al. | 707/10 |
| 5,574,898 | A * | 11/1996 | Leblang et al. | 707/1 |
| 6,029,195 | A * | 2/2000 | Herz | 725/116 |
| 6,606,659 | B1 * | 8/2003 | Hegli et al. | 709/225 |
| 2003/0154071 | A1 | 8/2003 | Shreve | |
| 2004/0107125 | A1 | 6/2004 | Guheen et al. | |

OTHER PUBLICATIONS

Chesnais, et al., The Fishwrap Personalized News System, Community Networking, 1995, 'Integrated Multimedia Services to the Home'., Proceedings of the Second International Workshop on, Jun. 20-22, 1995, pp. 275-282.*
Bharat, Personalized, Interactive News on the Web, Georgia Institute of Technology, May 5, 1997, pp. 1-22.*
Thomson, Freshman Publishing Experiment Offers Made-to-Order Newspapers, MIT News Office, <http://web.mit.edu/newsoffice/1994/newspaper-0309.html>, 1994, pp. 1-3.*
Kamba, et al., The Krakatoa Chronicle—An Interactive, Personalized, Newspaper on the Web, W3.org, <http://www.w3.org/Conferees/WWW4/Papers/93/>, 1993, pp. 1-12.*
Brill, E. et al., "An Analysis of the AskMSR Question-Answering System," Proceedings of the Conference on Empirical Methods in Natural Language Processing (EMNLP), Jul. 2002, pp. 257-264.
Brin, S., "Extracting Patterns and Relations from the World Wide Web," 12 pages.
Chang, C. et al., "IEPAD: Information Extraction Based on Pattern Discovery," WWW10 '01, ACM, May 1-5, 2001, pp. 681-688.
Chu-Carroll, J. et al., "A Multi-Strategy with Multi-Source Approach to Question Answering," 8 pages.

(Continued)

*Primary Examiner*—Wilbert L Starks, Jr.
(74) *Attorney, Agent, or Firm*—Morgan, Lewis & Bockius LLP

(57) ABSTRACT

A fact repository supports searches of facts relevant to search queries comprising keywords and phrases. The repository responds to requests from object requesters by sending a feed containing matching facts from the repository and, optionally, facts associated with the same object as the matching facts.

29 Claims, 11 Drawing Sheets

Example Facts in Repository (each fact is associated with an object ID)

OTHER PUBLICATIONS

Dean, J. et al., "MapReduce: Simplified Data Processing on Large Clusters," To appear in OSDI 2004, pp. 1-13.

Etzioni, O. et al., "Web-scale Information Extraction in KnowItAll (Preliminary Results)." WWW2004, ACM, May 17-20, 2004, 11 pages.

Freitag, D. et al., "Boosted Wrapper Induction," American Association for Artificial Intelligence, 2000, 7 pages.

Guha, R. et al., "Disambiguating People in Search," WWW2004, ACM, May 17-22, 2004, 9 pages.

Guha, R., "Object Co-identification on the Semantic Web," WWW2004, ACM, May 17-22, 2004, 9 pages.

Hogue, A.W., "Tree Pattern Inference and Matching for Wrapper Induction on the World Wide Web," Master of Engineering in Electrical Engineering and Computer Science, Massachusetts Institute of Technology, Jun. 2004, pp. 1-106.

"Information Entropy—Wikipedia, the free encyclopedia," [online] [Retrieved on May 3, 2006] Retrieved from the Internet<URL:http://en.wikipedia.org/wiki/Information_entropy>.

"Information Theory—Wikipedia, the free encyclopedia," [online] [Retrieved on May 3, 2006] Retrieved from the Internet<URL:http://en.wikipedia.org/wiki/Information_theory>.

Jones, R. et al., "Bootstrapping for Text Learning Tasks," 12 pages.

Kosseim, L. et al., "Answer Formulation for Question-Answering," 11 pages.

Liu, B. et al., "Mining Data Records in Web Pages," Conference '00, ACM, 2000, pp. 1-10.

McCallum, A. et al., "Object Consolodation by Graph Partitioning with a Conditionally-Trained Distance Metric," SIGKDD '03, ACM, Aug. 24-27, 2003, 6 pages.

Mihalcea, R. et al., "PageRank on Semantic Networks, with Application to Word Sense Disambiguation," 7 pages.

Mihalcea, R. et al., "TextRank: Bringing Order into Texts," 8 pages.

PCT International Search Report and Written Opinion, PCT/US06/07639, Sep. 13, 2006, 6 pages.

Prager, J. et al., "IBM's PIQUANT in TREC2003," 10 pages.

Prager, J. et al., "Question Answering using Constraint Satisfaction: QA-by-Dossier-with-Consstraints," 8 pages.

Ramakrishnan, G. et al., "Is Question Answering an Acquired Skill?", WWW2004, ACM, May 17, 2004, pp. 111-120.

Brin, S., "Extracting Patterns and Relations from the World Wide Web," 12 pages, date unknown.

Chu-Carroll, J. et al., "A Multi-Strategy with Multi-Source Approach to Question Answering," 8 pages, date unknown.

Dean, J. et al., "MapReduce: Simplified Data Processing on Large Clusters," To appear in OSDI 2004, pp. 1-13, date unknown.

Freitag, D. et al., "Boosted Wrapper Induction," American Association for Artificial Intelligence, 2000, 7 pages, date unknown.

Guha, R. et al., "Disambiguating People in Search," WWW2004, ACM, May 17-22, 2004, 9 pages.

Guha, R., "Object Co-identification on the Semantic Web," WWW2004, ACM, May 17-22, 2004, 9 pages.

Jones, R. et al., "Bootstrapping for Text Learning Tasks," 12 pages, date unknown.

Kosseim, L. et al., "Answer Formulation for Question-Answering," 11 pages, date unknown.

Liu, B. et al., "Mining Data Records in Web Pages," Conference '00, ACM, 2000, pp. 1-10, date unknown.

Mihalcea, R. et al., "PageRank on Semantic Networks, with Application to Word Sense Disambiguation," 7 pages, date unknown.

Mihalcea, R. et al., "TextRank: Bringing Order into Texts," 8 pages, date unknown.

Prager, J. et al., "IBM's PIQUANT in TREC2003," 10 pages, date unknown.

Prager, J. et al., "Question Answering with Constraint Satisfaction: QA-by-Dossier-with-Consstraints," 8 pages, date unknown.

* cited by examiner

Example Format of Facts in Repository (each fact is associated with an object ID)

Example Facts in Repository (each fact is associated with an object ID)

Example Object Reference Table

Example Format of Facts in
Repository (each fact is associated
with an object ID)

Example Objects

Example Annotations

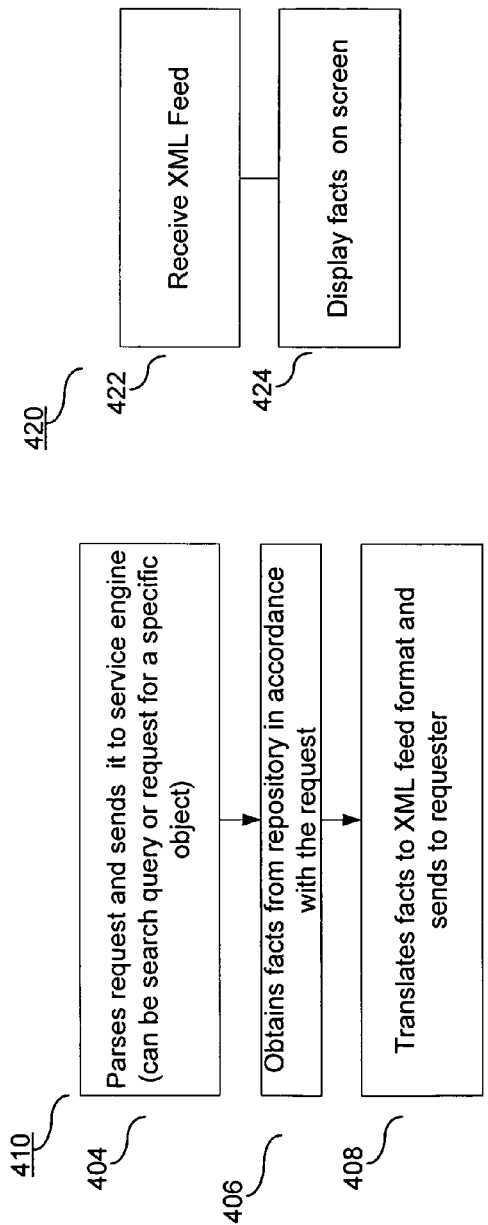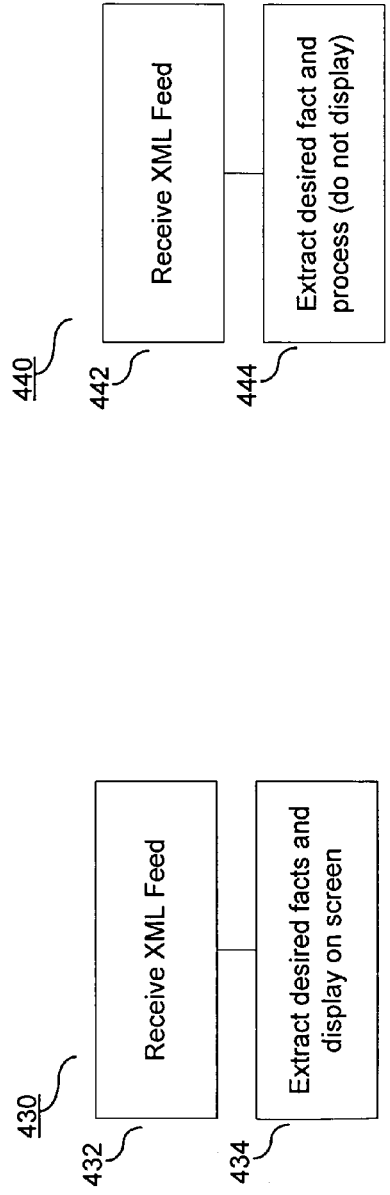

Original page

Updated Page

```
href="http://google.com/ref/api/q=China"></link><generator version='1.0' uri='http://
google.com'>Google Reference Pages</generator><openSearch><openSearch:totalResults>1039</
openSearch:totalResults><entry><id>http://google.com/ref/api/
1a27a12f0de4b506a93022496b370c40</id><link rel='self' type='application/atom+xml'
href="http://google.com/ref/api/1a27a12f0de4b506a93022496b370c40"></link>          601
<g:fact attribute='Name' value='China'><link href="http://www.cia.gov/cia/publications/factbook/
geos/ch.html"></link><link href="http://www.citypopulation.de/World.html"></link><link
href="http://www.infoplease.com/ipa/A0855603.html"></link></g:fact>
<g:fact attribute="Population" value="1306313812 (July 2005 est.)">
  <atom:link href="http://www.cia.gov" />
  <g:annotation begin="0" length="10">
    <g:number value="1306313812" />
  </g:annotation>
  <g:annotation begin="12" length="9">
    <g:date value="July 2005" />
  </g:annotation>
</g:fact>
<g:fact attribute="Diplomatic representation in the US (chancery)" value="2300 Connecticut
Avenue NW, Washington, District of Columbia, 20008">
  <atom:link href="http://www.cia.gov" />
  <g:annotation begin="0" length="4">
    <g:number value="2300" />
  </g:annotation>
  <g:annotation begin="61" length="6">
    <g:number value="20008" />
  </g:annotation>
  <g:annotation begin="28" length="39">
    <g:geoPt lat="38.936283" lon="-77.05994" />
  </g:annotation>
</g:fact>
</entry>
```

FIG. 6

SUPPORT FOR OBJECT SEARCH

CROSS-REFERENCE TO RELATED APPLICATIONS

This application is realted to the following U.S. Applications, all of which are incorporated by reference herein:

U.S. application Ser. No. 11/342,290, entitled "Data Object Visualization", filed on Jan. 27, 2006, by Andrew W. Hogue, David Vespe, Alex Kehlenbeck, Mike Gordon, Jeffrey C. Reynar, David Alpert;

U.S. application Ser. No. 11/342,293, entitled "Data Object Visualization Using Maps", filed on Jan. 27, 2006, by Andrew W. Hogue, David Vespe, Alex Kehlenbeck, Mike Gordon, Jeffrey C. Reynar, David Alpert;

U.S. application Ser. No. 11/356,679, entitled "Query Language", filed concurrently herewith, by Andrew W. Hogue, Doug Rohde;

U.S. application Ser. No. 11/356,837, entitled "Automatic Object Reference Identification and Linking in a Browseable Fact Repository", filed concurrently herewith, by Andrew W. Hogue;

U.S. application Ser. No. 11/356,851, entitled "Browseable Fact Repository", filed concurrently herewith, by Andrew W. Hogue, Jonathan T. Betz;

U.S. application Ser. No. 11/356,842, entitled "ID Persistence Through Normalization", filed concurrently herewith, by Jonathan T. Betz, Andrew W. Hogue, U.S. application Ser. No. 11/356,728, entitled "Annotation Framework", filed concurrently herewith, by Tom Richford, Jonathan T. Betz;

U.S. application Ser. No. 11/341,069, entitled "Object Categorization for Information Extraction", filed on Jan. 27, 2006, by Jonathan T. Betz;

U.S. application Ser. No. 11/356,838, entitled "Modular Architecture for Entity Normalization", filed concurrently herewith, by Jonathan T. Betz, Farhan Shamsi;

U.S. application Ser. No. 11/356,838, entitled "Attribute Entropy as a Signal in Object Normalization", filed concurrently herewith, by Jonathan T. Betz, Vivek Menezes;

U.S. application Ser. No. 11/341,907, entitled "Designating Data Objects for Analysis", filed on Jan. 27, 2006, by Andrew W. Hogue, David Vespe, Alex Kehlenbeck, Mike Gordon, Jeffrey C. Reynar, David Alpert;

U.S. application Ser. No. 11/342,277, entitled "Data Object Visualization Using Graphs", filed on Jan. 27, 2006, by Andrew W. Hogue, David Vespe, Alex Kehlenbeck, Mike Gordon, Jeffrey C. Reynar, David Alpert.

BACKGROUND OF THE INVENTION

1. Field of the Invention

This invention pertains in general to searching collections of data and, in particular, to ways of querying such collections of data.

2. Description of the Related Art

The World Wide Web and other information storage and retrieval systems contain a great deal of information. People have devised many ways of organizing and viewing this information.

As the retrieval and storage of information on the Internet continues to evolve, information is being stored in many different formats besides web pages. What is needed are new and advanced ways of accessing large collections of data from diverse sources, such as the Internet.

SUMMARY OF THE INVENTION

The described embodiments of the present invention provide a methodology and system for serving facts stored in a repository in association with objects. The fact repository includes a large collection of facts, each of which is associated with an object, such as a person, place, book, movie, country, or any other entity of interest. Each fact comprises an attribute, which is descriptive of the type of fact (e.g., "name," or "population"), and a value for that attribute (e.g., "George Washington", or "1,397,264,580"). A value can also contain any amount of text—from a single term or phrase to many paragraphs or pages—such as appropriate to describe the attribute. Each object will have a name fact that is the name of the object. The value of a value can thus include one or more phrases that are themselves the names of other facts.

The present invention further has embodiments in computer program products, in computer systems, and computer user interfaces, which various perform or cooperate in the operation or use of the foregoing method (or its alternative embodiments and features). Embodiments allow object requesters, such as browsers or other executable programs to request information from the fact repository. Such as request can be, for example, a request for a specific collection of facts associated with an object ID. Such a request can also be, for example, a search query.

The described embodiments receive a request from an object requester, parse the request and sends it to a service engine that retrieves facts from a fact repository. In one embodiment, the service engine returns all facts associated with an object ID. In one embodiment, the service engine returns one or more facts that satisfy the terms of a search query. The facts and object IDs from the repository are translated into an appropriate XML feed format, such as Atom, RSS, Amazon's OpenSearch, RDF, and OWL formats and returned to the object requester. Various object requesters process the returned feed in various ways.

BRIEF DESCRIPTION OF THE DRAWINGS

FIG. 4(a) shows a flow chart of a method of making requests from a fact repository of FIG. 3.

FIGS. 4(b)-4(d) show flow charts of methods of using facts retrieved from the repository.

FIG. 6 shows an example of an XML feed sent in response to a request from on object requester.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
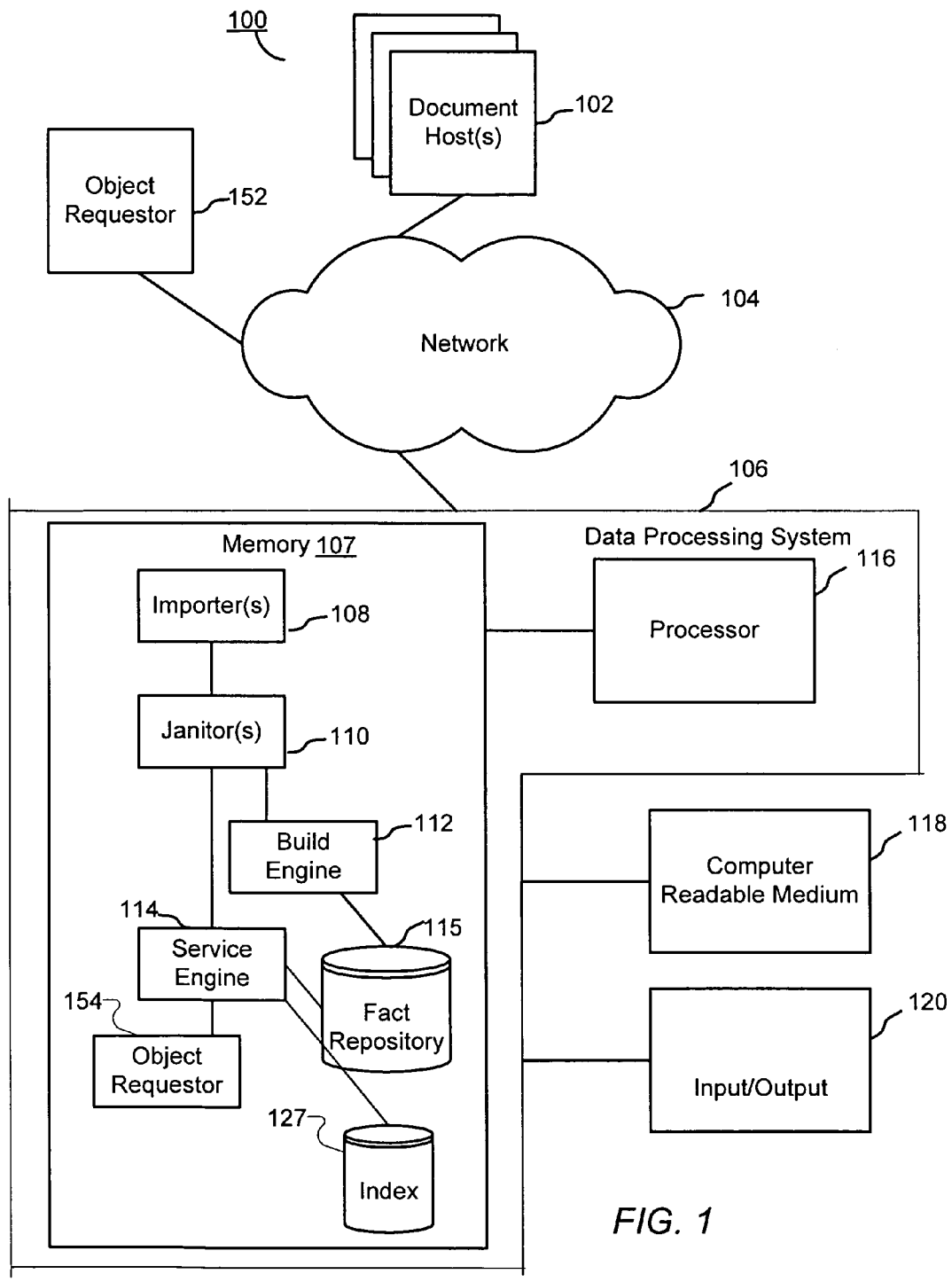
FIG. 1 shows a system architecture, in accordance with an embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "Dec. 2, 1981" while on another page that her date of birth is "Dec. 2, 1981."Birthday and Date of Birth might both be rewritten as Birthdate by one janitor and then another janitor might notice that Dec. 2, 1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

FIG. 2(*a*) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

FIG. 2(*b*) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(*b*) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

FIG. 2(*c*) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(*b*) and 2(*c*) illustrate the object reference table 210 with explicit coding of object and fact IDs, the table also may contain just the ID values themselves in column or pair-wise arrangements.

FIG. 2(*d*) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(*d*) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2A:
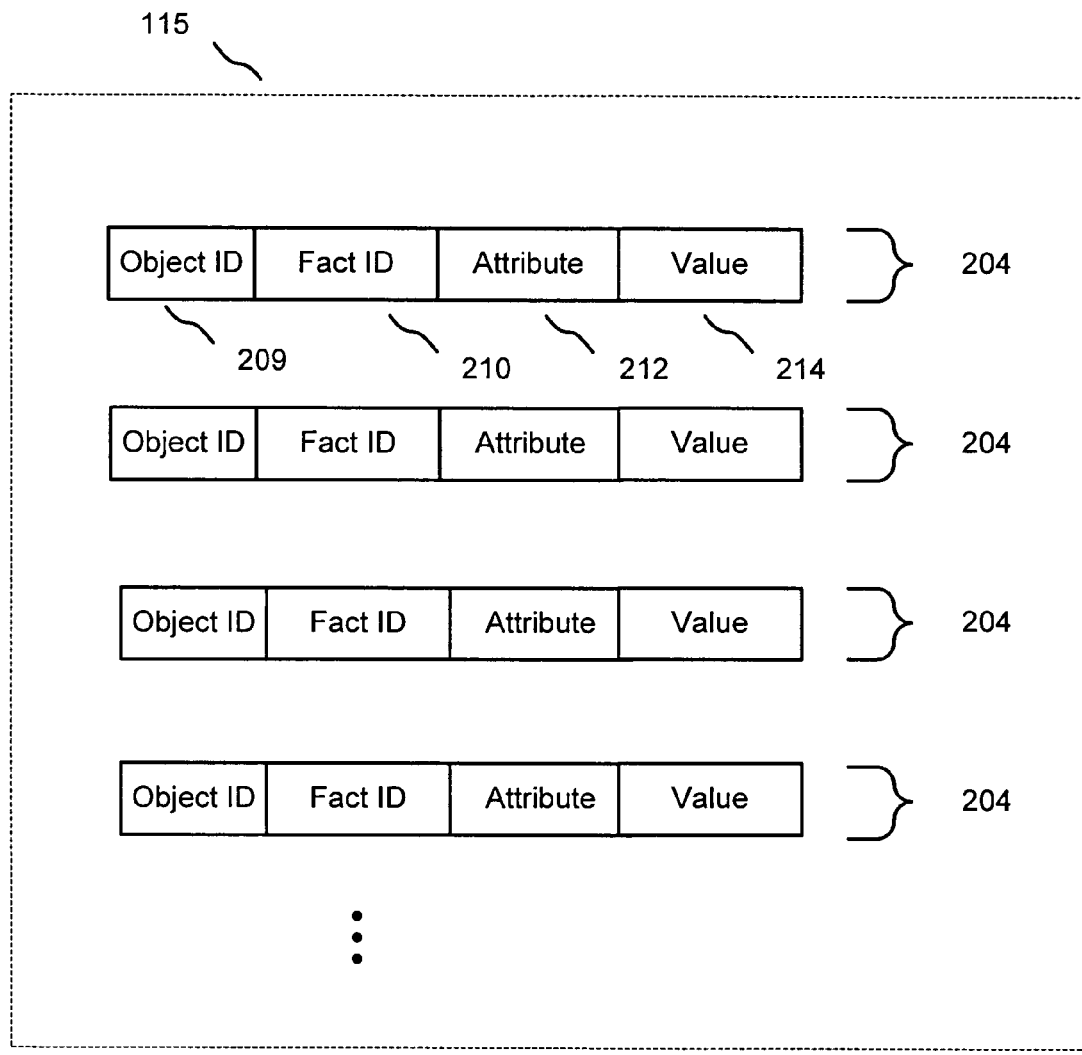
FIGS. 2(a)-2(d) are block diagrams illustrating a data structure for facts within a repository of FIG. 1 in accordance with preferred embodiments of the invention.
Figure 2B:
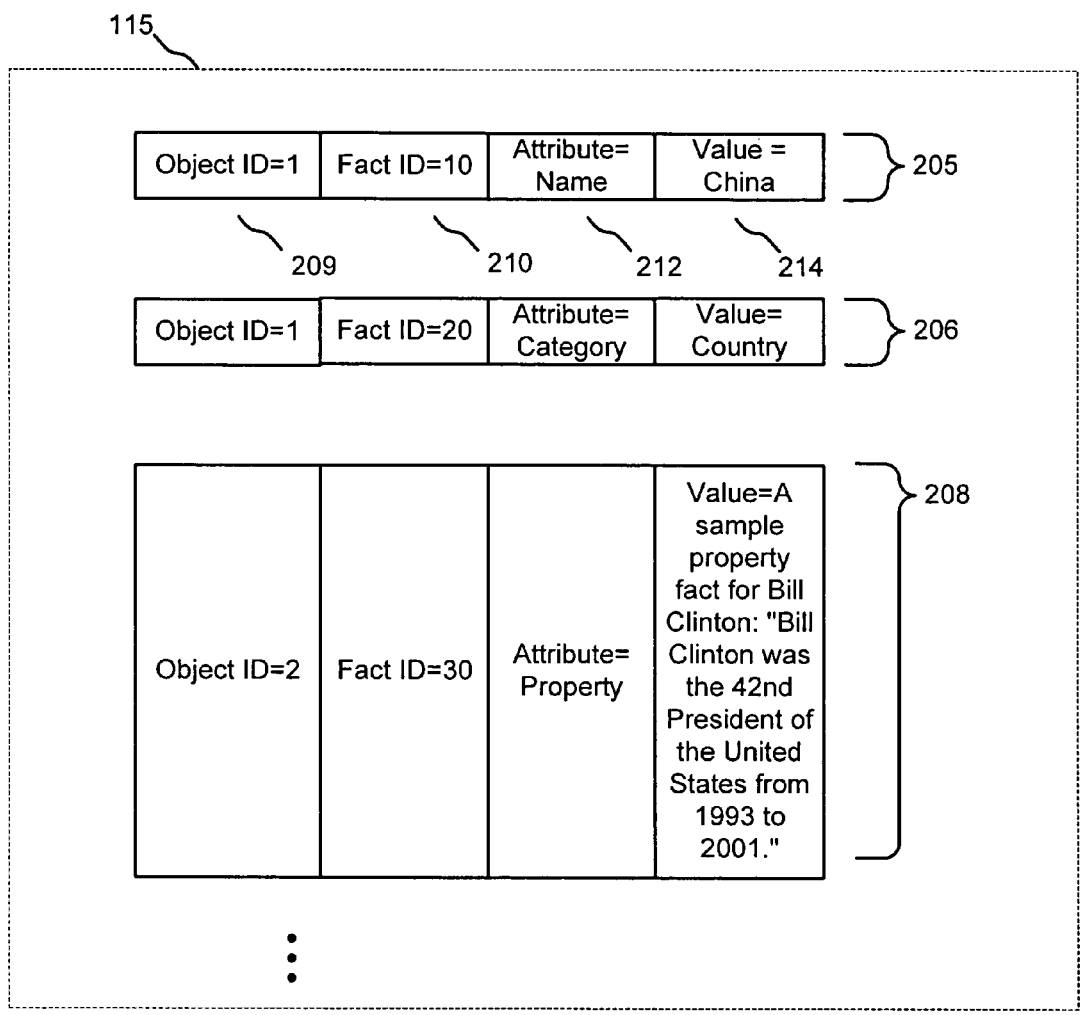
Figure 2C:
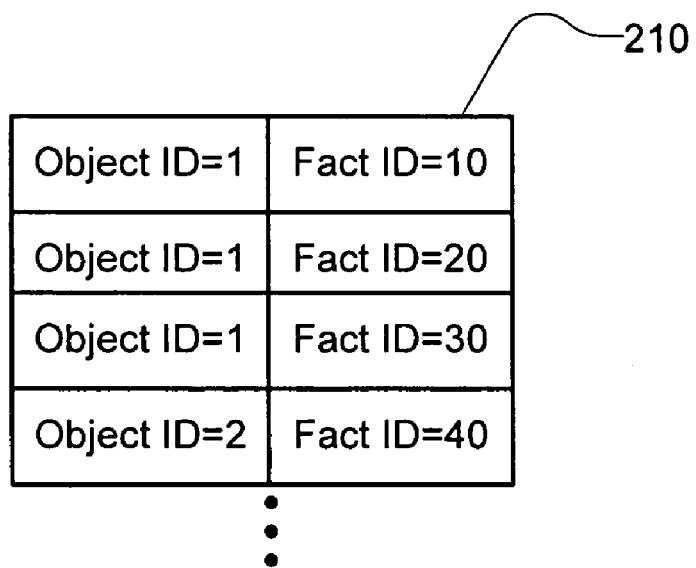
Figure 2D:
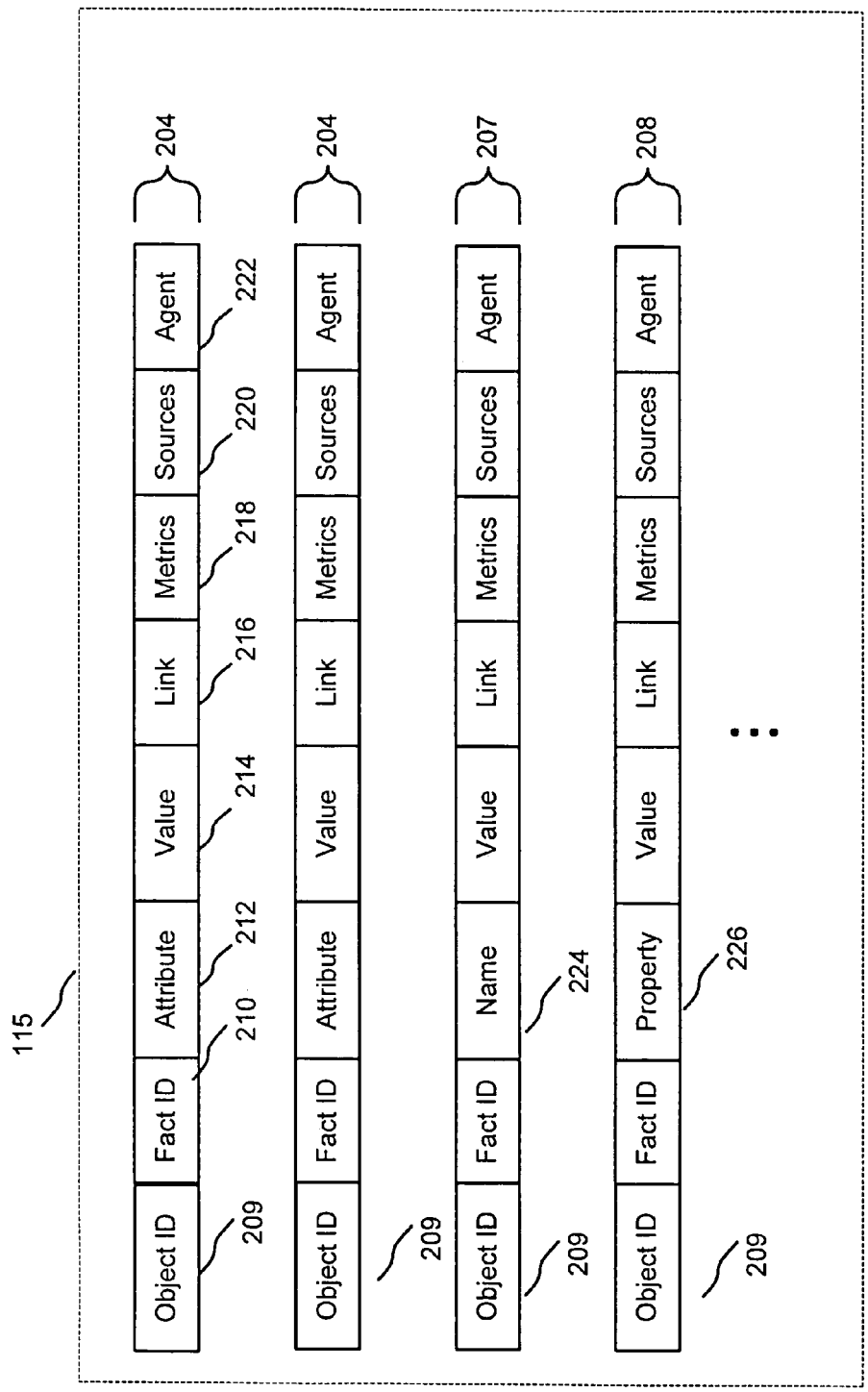
Figure 2E:
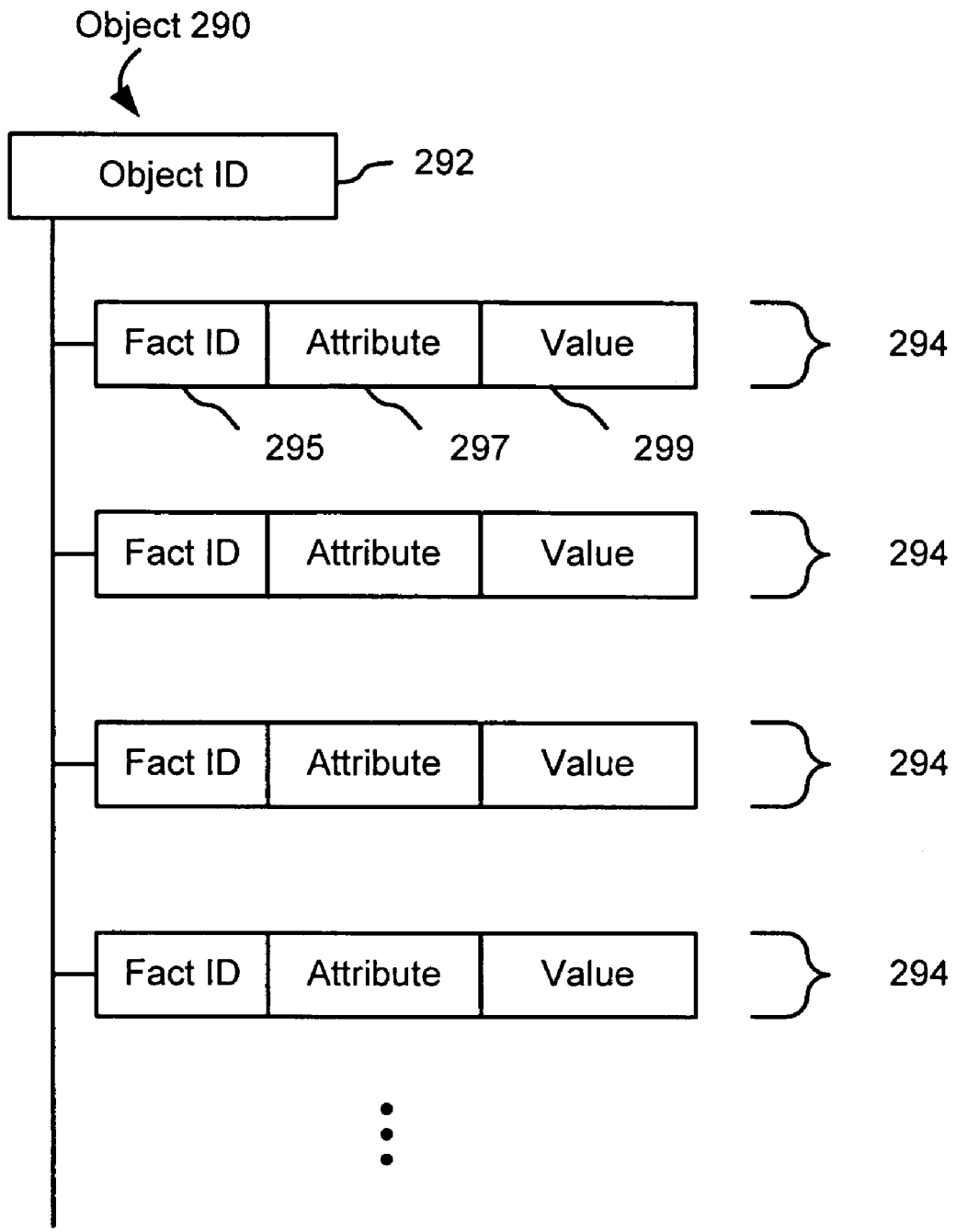
FIG. 2(e) is a block diagram illustrating an alternate data structure for facts and objects in accordance with preferred embodiments of the invention.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Referring again to FIG. 1, the content of the facts in the repository 115 are also indexed in index 127. The index 127 maintains a term index, which maps terms to (object, fact, field, token) tuples, where "field" is, e.g., attribute or value. The service engine 114 is adapted to receive keyword queries from clients such as object requestors, and communicates with the index 127 to retrieve the facts that are relevant to user's search query. For a generic query containing one or more terms, the service engine 114 assumes the scope is at the object level. Thus, any object with one or more of the query terms somewhere (not necessarily on the same fact) will match the query for purposes of being ranked in the search results.

In one embodiment the ranking (score) of an object is a linear combination of relevance scores for each of the facts. The relevance score for each fact is based on whether the fact includes one or more query terms (a hit) in, for example, one of the attribute, value, or source portion of the fact. Each hit is scored based on the frequency of the term that is hit, with more common terms getting lower scores, and rarer terms getting higher scores (e.g., using a TF-IDF based term weighting model). The fact score is then adjusted based on additional factors. These factors include the appearance of consecutive query terms in a fact, the appearance of consecutive query terms in a fact in the order in which they appear in the query, the appearance of an exact match for the entire query, the appearance of the query terms in the name fact (or other designated fact, e.g., property or category), and the percentage of facts of the object containing at least one query term. Each fact's score is also adjusted by its associated confidence measure and by its importance measure. Since each fact is independently scored, the facts most relevant and important to any individual query can be determined, and selected. In one embodiment, a selected number (e.g., 5) of the top scoring facts is selected for display in response to a query.

A user interface for browsing the fact repository 115 is discussed in co-pending U.S. application Ser. No. 11/356,851, entitled "Browsable Fact Repository" of Betz and Hogue, which is herein incorporated by reference.

Figure 2F:
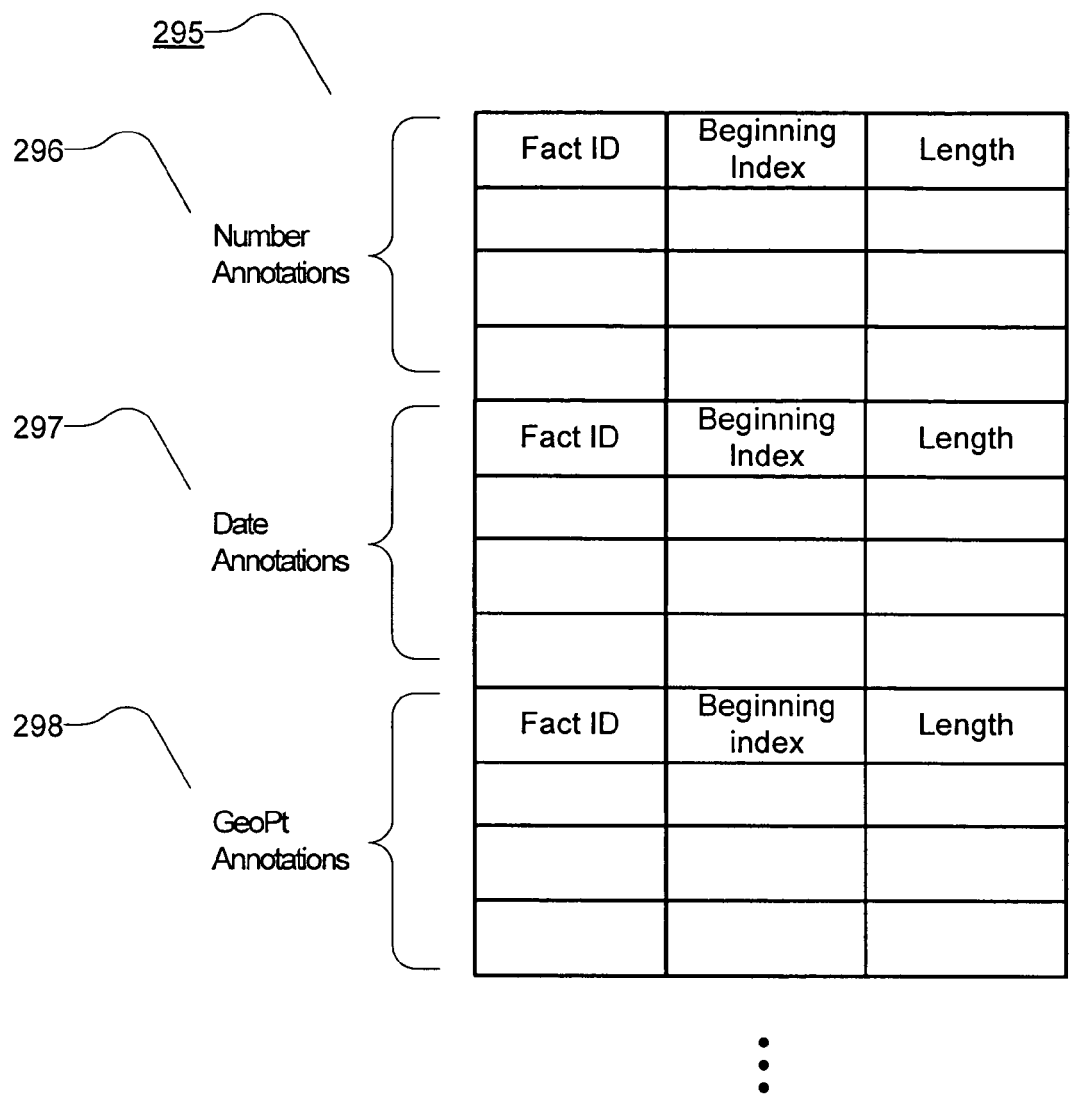
FIG. 2(f) shows a plurality of annotations associated with facts in a repository.

FIG. 2(f) shows a plurality of annotations associated with facts in repository 115. The Figure shows three types of annotations (although there can be other types): Number annotations 296, date annotations 297, and geoPoint (geoPt) annotations 298. Each annotation has at least a fact ID, a beginning index in the value of the fact with the fact ID, and a length within the value of the fact value.

Annotations provide a quick way of accessing commonly desired portions of facts. As an example, if a fact 1 has a value of "Anne Bancroft was born Jan. 1, 1935" a date annotation associated with that fact might have the fact ID of fact 1, an index of 24 (because the date starts on character 24, indexed from 0), and a length of 15 (because the date is 15 characters long). (Note that, in a preferred embodiment, all fact values, including numeric values dates, latitude and longitude are stored in repository 115 as characters). Some embodiments also store a copy of the annotation value (for example "Jan. 1, 1935") with the annotation. Others do not store the value with the annotation, but index into the appropriate fact to retrieve it. Other embodiments store the annotations as part of the facts instead of separately. Some embodiments index annotations in index 127, causing them to be searchable.

Figure 3:
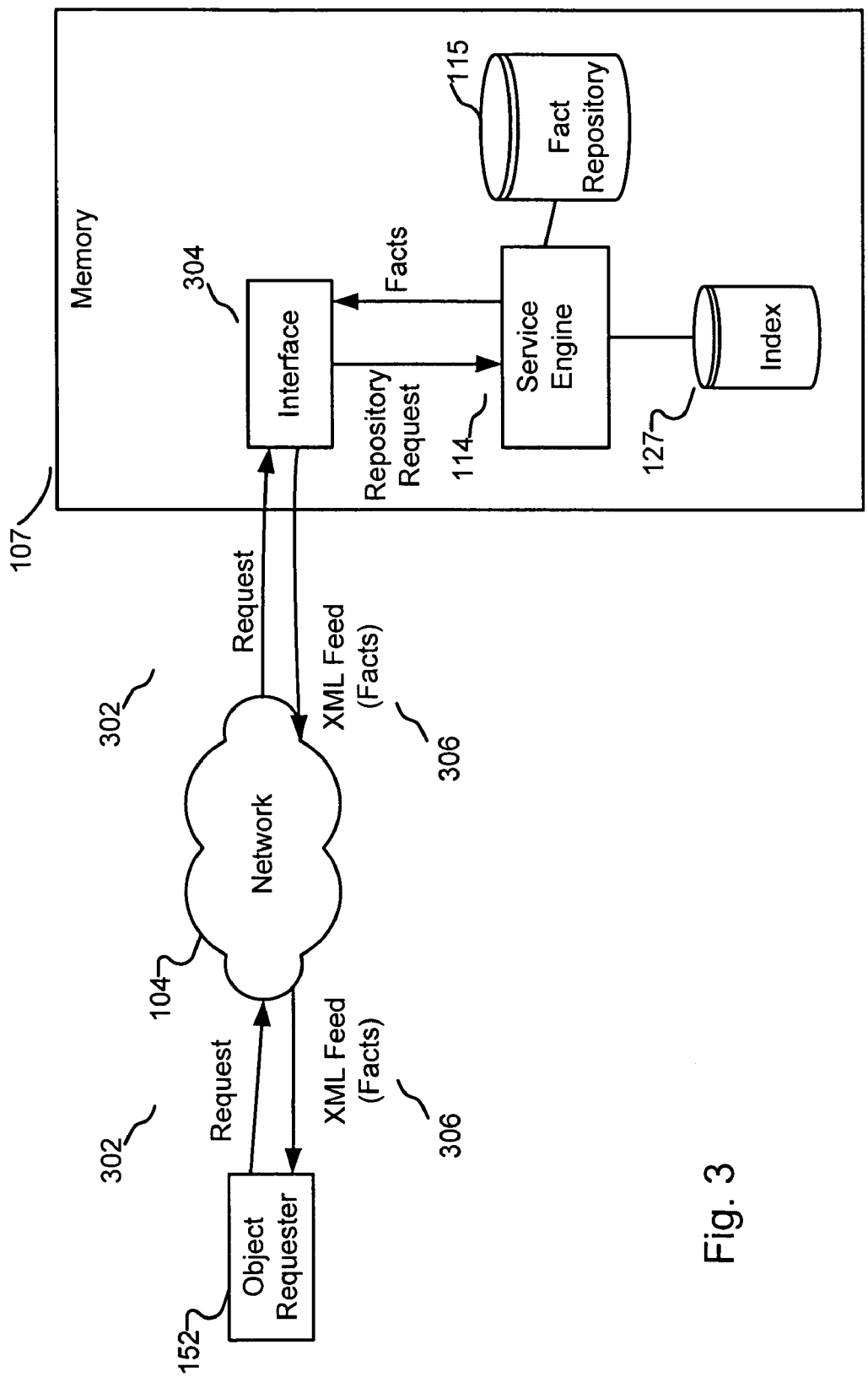
FIG. 3 shows a data flow of requests within a system architecture of FIG. 1.

FIG. 3 shows a data flow of requests within a system architecture of FIG. 1. Object requester 152 sends a request 302 to interface 304 via network 104. Interface 304 sends a repository request to service engine 114. The repository request can be either a query or a request for a particular object, as described below. Service engine 114 processes the request and sends one or more facts from repository 115. Interface 304 converts the facts to a feed 306, which is then sent to object requester 152.

Feed 306 can be any appropriate XML feed format, including but not limited to: Atom, RSS, Amazon's OpenSearch, RDF, and OWL formats.

It will be understood that object requester 154 of FIG. 1 can also send requests if appropriate, even though it is a part of the data processing system 100.

In one embodiment, results are returned to the object requester. In another embodiment, results are returned to a predefined third location that is not the object requester. In another embodiment, results are returned to a user's browser, but the user's browser is not the object requester. In another embodiment, results are returned to a location dependent on the results, which may include multiple predetermined locations.

FIG. 4(a) shows a flow chart 410 of a method of making requests from a fact repository of FIG. 3. In one embodiment, this method is performed by interface 304. In element 404, a request is received, parsed, and sent to service engine 114 as a repository request. The request can be any type of request for facts from the repository including, for example:
  a query the same as or similar to queries entered via a search engine
  a request for facts of a particular object ID Element 406 receives one or more facts from repository 115 in response to the repository request, either directly or indirectly. Element 408 translates the facts into an XML feed format and sends the feed to the requester 152.

Figure 5A:
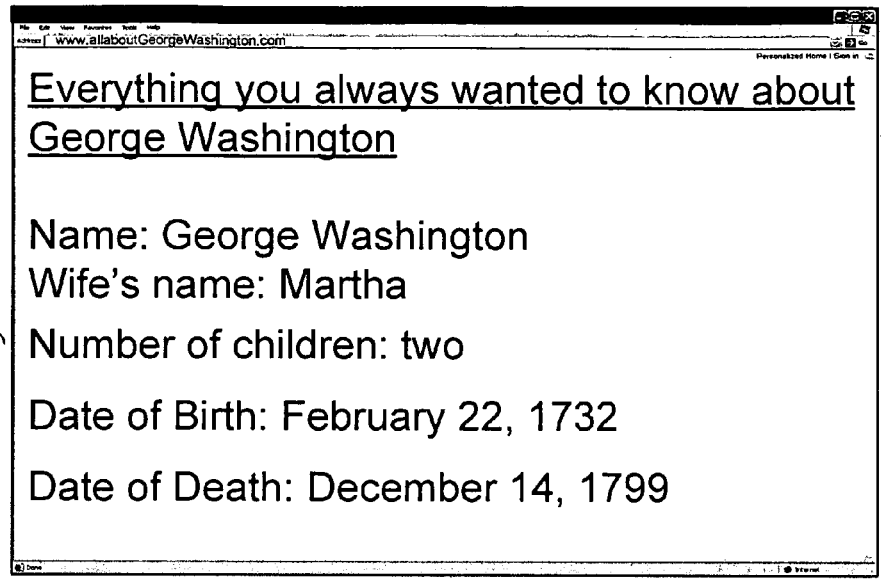
FIGS. 5(a)-5(b) show examples of a screen display in accordance with the facts of a requested object.
Figure 5B:
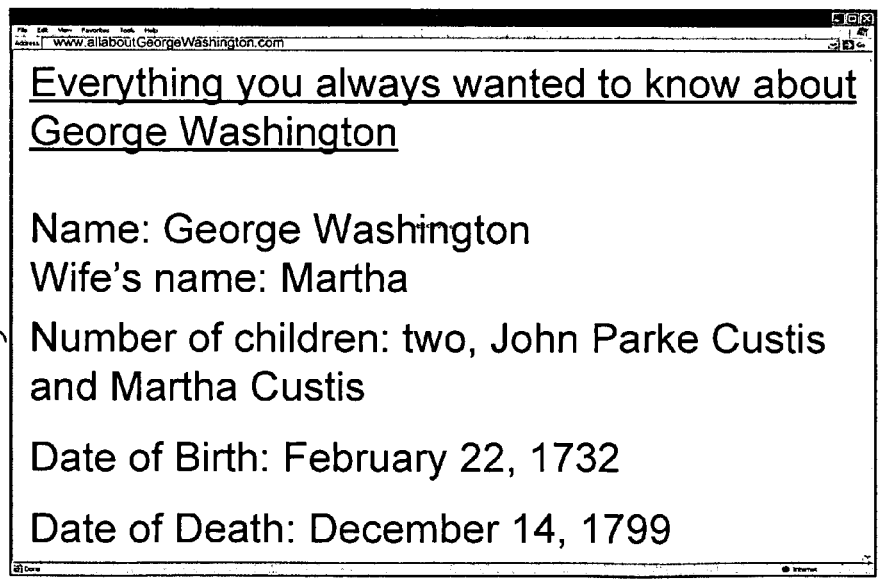

FIGS. 4(b)-4(d) show flow charts 420, 430, 440 of methods of using facts retrieved from the repository. Object requester 152 (or 154 of FIG. 1) receives 422 an XML feed from interface 304. The XML feed contains, at a minimum, facts from the repository, including but not limited to annotations. As shown in FIGS. 5(a) and 5(b), the received facts are displayed 424 on a display screen.

Often, numerous facts and other types of data, such as annotations, are received from interface 304 and not all of the returned information is required to effect the desired display. In FIG. 4(c), an object requester 152 (or 154 of FIG. 1) receives 432 an XML feed from the interface 304. The XML feed contains, at a minimum, facts from the repository and may also contain additional types of information, including but not limited to annotations. As shown in FIGS. 5(a) and 5(b), desired facts (and other types of information) are extracted and displayed on a display screen. For example, a web page may be set up to display a score of a most recent baseball game played by a particular team. The received facts might include all facts for the object for that team. In the example, only the "score" fact and its value (i.e., the score of the game) are needed for display. Other facts of the team's object, such as player stats, are not used. As another example, a web page might contain instructions causing the retrieved facts to be searched for potentially obscene material or for other types of non-desirable information so that they can be screened or removed before display.

Sometimes the retrieved facts and other information are not displayed at all, but are used in other ways. In FIG. 4(d), an object requester 152 (or 154 of FIG. 1) receives 422 an XML feed from the interface 304. The XML feed contains, at a minimum, facts from the repository but may contain other types of information such as annotations. Some or all of these facts are processed but not displayed. A retrieved fact or other information may be used to determine what information to display, even though the fact itself is not displayed. For example, in a web page for the World Series baseball game, different display elements may be shown on the screen, depending on which team won the series in a particular year. Moreover, a retrieved fact or other information may be used as a part of calculation or processing that does not change a display. For example, a team score may be used to calculate team statistics for purposes other than display.

As another example, a system can perform a computation across several objects. For instance, such a system might compute the average age at death of Presidents by searching for "president," computing age via (death date—date of birth), and then averaging across all the objects returned from the search.

As another example, a system might plot facts on a map (e.g., the birth places of all members of the Yankees baseball team) or on a timeline (e.g., the dates of the Yankees's World Series wins).

FIGS. 5(a)-5(b) show examples of a screen display in accordance with the facts of a requested object. FIG. 5(a) shows a web page 500 displaying information about George Washington. The display includes information stating that he had two children 502. The next time the page is viewed or refreshed, a request is sent to update the information on the page. In this example, the facts in repository 115 concerning George Washington have been updated between the two times that the page was fetched or refreshed. Specifically, the repository now contains information that George Washington had two children and what their names were, John Parke Custis and Martha Custis. In response to the repeated request, this newly updated fact is sent to the requesting browser and the web page of FIG. 5(b) is displayed. Thus, the owner of the web page about George Washington might include a portion of his page that results in a request for the most recent version of the facts associated with the George Washington object. Every time the page is fetched or refreshed, request for the object is sent and a page in accordance with the most recent facts of the "George Washington" object will be displayed.

In one embodiment, object requester 152 queries interface 304 by issuing an HTTP GET command. The query URI is the feed's URI followed by query parameters encoded in path form.

Every component of the path following the FeedURI is considered a parameter and has a name=value form. In one embodiment, a query can have the following parameters: q, max-results, start-index, max-facts, and max-sources.

The "q" parameter indicates a query. The "max-results" parameter indicates a maximum number of results (e.g., object) to return. The "start-index" indicates which results to return, with the first results being indexed as result 0. (Other embodiments use 1 as a starting index). The "max-facts" parameter indicates a maximum number of facts to return per object. The "max-sources" parameter indicates a maximum number of sources to return per fact. In the described embodiment, the following defaults are used:
 Max_results: 20
 Start_index: 0 (or 1 in a system indexed from 1)
 Max_facts: no limit
 Max_sources: no limit The following are some example queries (all of which should be prefixed with a URL of interface 304, such as: http://www.google.com/ref/api):
/q=albert+einstein
 (query for "albert einstein")
/q=albert+einstein?max-results=20
 (query for "albert einstein", returns 20 results)
/q=albert+einstein?start-index=5&max-results=10
 (returns results 5 through 15)
/q=albert+einstein?max-results=30&start-index=10
 (returns results 10 through 40)
/max-facts=25/q=united+states
 (query for "united states" but only return the first 25 facts for each object)
/max-facts=25/q=united+states?max-results=5
 (return the top 5 results, and only the top 25 facts for each of those results)
/max-sources=4/q=united+states
 (only return four sources for each fact)
/max-facts=15/max-sources=6/q=united+states?max-results=20&start index=5
 (results 5 through 25, and for each one, only return the top 15 facts and the top 6 sources for each fact)

In an embodiment, the query sent can be any query using the query language described in U.S. application Ser. No. 11/356,679, filed concurrently herewith, entitled "Query Language" of Rohde and Hogue. In the embodiment shown herein, the "+" character is used in place of spaces.

In one embodiment, the parameters max-facts and max-sources are required to be placed before the q parameter because they are extensions to a known namespace and the parameters max-results and start-index come after the q parameter because they are paging parameters. Other embodiments may use other requirements for parameter placement.

In addition to queries, a request can also be a request for a specific object ID (as in the George Washington object example above). Such a request might look like:
 http://www.google.com/ref/api/ 923980273ab29083bfc089c FIG. 6 shows an example of an partial entry 600 in an XML feed 306 sent in response to a request from object requester 152 (for example, the request:
 http://google.com/ref/api/q=china). In the example, an entry corresponds to an object and each atom corresponds to a fact in the object. An object can have more than one associated fact. This example uses the Atom format, although any appropriate feed format can be used, and is a part of the larger example shown in Table 1 of this document. Table 2 shows an example of RSS format. Table 3 shows an example of OpenSearch format. Each of these Tables is a part of this application and is incorporated herein by reference.

In the described embodiment, each object has an associated object ID 601 (in this example "1a27a12f0de4b506a93022496b370c40"). The feed includes a plurality of facts 602, 604, 606. Fact 602 shows an example of a fact having an attribute and an attribute value, along with a link representing a source of the fact.

Note that, in certain embodiments, for facts associated with an object to be returned in response to a query, only one fact needs to match the query. Thus, in the example, the q parameter is "q=China". Fact 602 has a fact with a value containing the string "China". Facts 604 and 606 do not contain the query string "China," but are returned because they are facts associated with the same object as fact 602. As discussed above, not all facts associated with an object are always returned. The order in which facts of an object are returned varies with implementation. In at least one embodiment, for each fact, the facts that actually contain the query string are prioritized to be returned first in the feed. If the feed limits the number of facts to be returned per object, not all facts containing the query string may be returned. In one embodiment, facts containing a "Name" attribute with a value matching the query string are returned first in a feed entry. The query looks at both the attribute and values of facts. In some embodiments, it also looks at such things as the source of the fact or other values such as those shown in FIG. 2(d). In one embodiment, the order of facts returned is the same as for a web search interface. At the moment, for example, one embodiment uses "scored order", where the fact matching the query is promoted. Other embodiments use "importance order", in which facts are placed in an appropriate order of "importance", with facts like name and date of birth coming before more obscure facts like "parents' place of birth".

Some embodiments return partial facts as well as or in addition to complete facts. For example, a query for the date of birth attribute for object number 2038472038 might just return "Jun. 17, 1974" and no other facts for that object.

Fact 604 also includes an attribute and a value, and further includes an annotation. In one embodiment, an annotation is associated with a fact in repository 115.

In FIG. 6, the feed for fact 604 has an attribute and a value:

```
attribute="Population" value="1306313812 (July 2005 est.)"
    The feed for fact 604 also has a source link:
    <atom:link href="http://www.cia.gov" />
```

The feed for fact 604 also has two associated annotations:

```
<g:annotation begin="0" length="10">
    <g:number value="1306313812" />
</g:annotation>
<g:annotation begin="12" length="9">
    <g:date value="July 2005" />
</g:annotation>
```

In this embodiment, each annotation has a beginning index, a length, and a value. One of the annotations is a number annotation with a value of "1306313812". The other annotation is a date annotation with a value of "July 2005".

In the feed for fact 606 has an associated geopoint annotation:

```
</g:annotation>
<g:annotation begin="28" length="39">
    <g:geoPt lat="38.936283" lon="-77.05994" />
</g:annotation>
```

A geopoint annotation represents a latitude and longitude associated with a fact. Geopoint annotations are noteworthy at least because they contain a two-part value (latitude and longitude). Other types of annotations can have two-or-more-part values as well. Note that in this example, the latitude and longitude values themselves do not appear in the fact. Instead, the value "Washington, District of Columbia, 20008" appears. At some point, an annotation was created for the latitude and longitude of Washington, D.C. and stored in association with that fact (and most likely with all other facts containing a mention of "Washington, D.C.").

It will be understood that other types of annotations can be used in the present invention, including but not limited to: name annotations, isbn annotations, units (to indicate a unit for numerical values).

As discussed above, the feed received by an object requester can be used in a number of ways, including but not limited to display and calculation.

Some embodiments also support an "salt" parameter, which allows the user to specify the format of the results. It has three possible values: "atom" [default], "rss", "osrss".

EXAMPLES

/alt=atom/q=albert+einstein
results for the query "albert einstein" returned in Atom format
/alt=rss/q=albert+einstein
results for the query "albert einstein" returned in RSS format
/alt=osrss/q=albert+einstein
results for the query "albert einstein" returned in OpenSearch format
The alt parameter can be combined with the various other parameters:
/max-facts=5/alt=rss/max-sources=4/q=albert+einstein-?start-index=10 five facts per object, four sources per fact, starting at the 10th result, in RSS format The above-described embodiments of the invention are read only, i.e., data flows from the repository to the object requester. Other embodiments, however, might include data flowing from a client into the repository. Such embodiments would include methods to make sure that clients are authenticated before writing and that multiple clients do not overwrite each other's work (or if they do, that a record is kept to enable undo's if needed).

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer implemented method of querying a fact collection repository, the method comprising:
storing a plurality of facts in the fact collection repository, the fact collection repository embodied in a computer-readable storage medium, each fact associated with at least one collected fact object, each fact associated with the collected fact object having a type of fact attribute and a fact value, and each collected fact object having at least one collected fact with a type of fact attribute being a name type;
receiving at a server computer system a search query from an object requester at a client computer;
retrieving at the server computer system at least one fact from the fact collection repository, corresponding to the received search query-sending from the server computer system the fact attribute and fact value of the retrieved fact to the object requester at the client computer; and
storing the fact at the client computer.

2. The method of claim 1, wherein the search query is a request for facts associated with a particular fact object.

3. The method of claim 1, wherein retrieving at least one fact from the fact collection repository corresponding to the received search query further comprises:
retrieving at least one fact from the fact collection repository that is relevant to the search query based upon a relevance score of the fact with respect to the search query.

4. The method of claim 1, wherein one of the fact attribute and the fact value of the retrieved fact matches the query.

5. The method of claim 1, further comprising:
determining an object ID that corresponds to the fact; and
sending the object ID to the object requester along with the fact attribute and fact value.

6. The method of claim 1, further comprising:
determining an object ID that corresponds to the fact; and
sending other facts associated with the object ID to the object requester.

7. The method of claim 1, wherein sending the fact attribute and fact value of the retrieved fact to the object requester comprises sending using an Atom feed format.

8. The method of claim 1, wherein sending the fact attribute and fact value of the retrieved fact to the object requester comprises sending using an RSS feed format.

9. The method of claim 1, wherein sending the fact attribute and fact value of the retrieved fact to the object requester comprises sending using an OpenSearch format.

10. The method of claim 1, wherein the search query contains a "q" parameter indicating a query string.

11. The method of claim 1, wherein the search query contains a parameter indicating a maximum number of fact objects to return.

12. The method of claim 1, wherein the search query contains a parameter indicating an index of a first fact object to return.

13. The method of claim 1, wherein the search query contains a parameter indicating a maximum number of facts to return per fact object.

14. The method of claim 1, wherein the search query contains a parameter indicating a maximum number of sources to return per fact.

15. The method of claim 1, further comprising sending from the server computer system an annotation associated with the fact, the annotation having a portion of the fact's fact value therein.

16. The method of claim 15, wherein the annotations are sent after the fact attribute and fact value of the fact.

17. A server computer system to allow a user to search a fact collection repository, comprising:
fact collection repository embodied in a computer-readable storage medium, each fact associated with at least one collected fact object, each fact associated with the collected fact object having a type of fact attribute and a fact value, and each collected fact object having at least one collected fact with a type of fact attribute being a name type,
a query receiver that receives a search query from an object requester at a client computer;
a fact reviewer for retrieving at least one fact from the fact collection repository, the retrieved fact corresponding to the received search query and having an fact attribute and a fact value; and
an interface for sending the fact attribute and fact value of the retrieved fact to the object requester at the client computer using a feed format.

18. The system of claim 17, wherein the search query is a request for facts associated with a particular object.

19. The system of claim 17, wherein the fact reviewer retrieves at least one fact from the fact collection repository that is relevant to the search query based upon a relevance score of the fact with respect to the search query.

20. The system of claim 17, wherein the fact reviewer further comprises:
a module for determining an object ID that corresponds to the fact; and
a module for sending the object ID to the object requester along with the fact attribute and fact value.

21. The system of claim 17, wherein the fact reviewer further comprises:
a module for determining an object ID that corresponds to the fact; and
a module for sending other facts associated with the object ID to the object requester.

22. A computer implemented method of querying a fact collection repository embodied in a computer-readable storage medium, each fact associated with at least one collected fact object, each fact associated with the collected fact object having a type of fact attribute and a fact value, and each collected fact object having at least one collected fact with a type of fact attribute being a name type, the method performed by an object requester and comprising:
sending a search query from the object requester at a client computer to the fact collection repository;
receiving from the server computer system a feed having at least one fact from the repository, the feed contents having at least one fact corresponding to the received search query and having an object ID; and
storing the received feed in a computer readable medium.

23. The method of claim 22, wherein the feed comprises at least two facts, at least one of the facts matching the query and at least one of the facts not matching the query, both facts being associated with the object ID.

24. The method of claim 22, wherein the search query is a request for facts associated with a particular object.

25. The method of claim 22, wherein the search query is a query that can be matched by fact attributes or fact values of facts in the fact collection repository.

26. The method of claim 22, further comprising using the received feed to generate a display screen at a client computer.

27. The method of claim 22, further comprising using the received feed to calculate a fact value.

28. A computer implemented method of querying a fact collection repository, the method comprising:

storing a plurality of facts in the fact collection repository, the fact collection repository embodied in a computer-readable storage medium, each fact associated with at least one collected fact object, each fact associated with the collected fact object having a type of fact attribute and a fact value, and each collected fact object having at least one collected fact with a type of fact attribute being a name type;

receiving at a server computer system a search query from an object requester at first computer system;

retrieving at the server computer system at least one fact from the repository, the at least one fact corresponding to the received search query;

sending the fact attribute and fact value of the retrieved fact to a predetermined second computer system that is remote from the first computer system; and storing the fact at the second computer system.

29. A computer implemented method of querying a fact collection repository comprising a plurality of facts associated with objects, the method comprising:

storing a plurality of facts in the fact collection repository, fact collection repository embodied in a computer-readable storage medium, each fact associated with at least one collected fact object, each fact associated with the collected fact object having a type of fact attribute and a fact value, and each collected fact object having at least one collected fact with a type of fact attribute a name type;

receiving at a server computer system a search query from an object requester at a first client computer;

retrieving at the server computer system at least one fact from the repository, the at least one fact corresponding to the received search query; and sending from the server computer system the fact attribute and fact value of the retrieved fact to a browser application executed on a second client computer.

* * * * *